United States Patent [19]
Farmer

[11] B 3,982,333
[45] Sept. 28, 1976

[54] COLORCODE SPELLER

[76] Inventor: William Robert Farmer, 215 Campbell St., New Westminister, British Columbia, Canada, V3M-5K8

[22] Filed: Oct. 2, 1974

[21] Appl. No.: 511,454

[44] Published under the second Trial Voluntary Protest Program on February 24, 1976 as document No. B 511,454.

[52] U.S. Cl............................................ 35/36; 35/2
[51] Int. Cl.²......................................... G09B 11/00
[58] Field of Search............... 35/35 R, 35 G, 35 H, 35/36, 37, 2, 75; 283/11

[56] References Cited
UNITED STATES PATENTS

| | | | |
|---|---|---|---|
| 165,126 | 6/1875 | Shepherd | 35/62 |
| 450,092 | 4/1891 | Wyman | 35/62 |
| 1,286,157 | 11/1918 | Vizcarra | 35/75 |
| 2,439,413 | 4/1948 | Mitchell | 35/2 |

Primary Examiner—Wm. H. Grieb

[57] ABSTRACT

Means of teacher teaching and pupil learning to spell words and sentences, with code marked alphabet letters and code marked word and sentence lanes.

7 Claims, 2 Drawing Figures

COLORCODE SPELLER

BACKGROUND OF THE INVENTION

This invention relates to educational puzzles and more particularly to a teacher and pupil means of teaching and learning to spell words and sentences, in which a teacher code marks certain word spelling alphabet letters, and the pupil copies the code marked alphabet letters into word readable form, in writeon ruboff lanes with identical code marks as the code marked alpha letters. A code shape mark crayon drawing of a girl in a writeon ruboff lane over certain alphabet letters will spell her name and what she has. A drawing of an aeroplane spells aeroplane.

SUMMARY OF THE INVENTION

The present invention provides the use of 27 lines of alphabet letters ABCDEFGHIJKLMNOPQRSTUVWXYZ equally spaced by 27 lanes of writeon ruboff lanes, for the purpose of code marking certain word and sentence spelling alphabet letters. Also provided is four writeon ruboff word and sentence spelling lanes, with code marks to match alphabet letter code marks, and into which the code marked alphabet letters are copied to spell words and sentences.

Figures 1, 2:
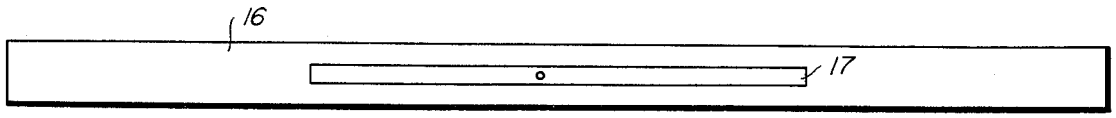
FIG. 1 face view of the colorcode speller shows 27 lines of alphabet letters equally spaced by 27 code letter marking lanes, which are for the purpose of code marking word spelling alphabet letters, also shown four lanes in which like code marked letters are copied into like code marked lanes, numbers from 1 to 27 can be used for counting, or as dates when code marked with other numbers.

Code marking letter and word lanes have a writeon ruboff surface suitable for colored crayons, and the alphabet letters are sealed to prevent scuffing. Drawing of girl code mark, in writeon ruboff lanes 1 to 26 and over certain alphabet letters, will spell Suzie Farmer has a bicycle when copied into identical code word lanes. ✗ Aeroplane code mark.

FIG. 2 is end edge of the colorcode speller showing a drawer, in which is colored crayons, a ruboff sponge, sample code marked sheets and a one alphabet row-at-a-time slide sheet.

DESCRIPTION OF THE PREFERRED EMBODIMENT

Referring particularly to FIG. 1 of the drawings the numeral 4 indicates a colorcode speller, having 27 alphabet lines 5 which are spaced by 27 writeon ruboff code mark lanes 6. 7 is word spelling lane marked at top by a red code dot 10 the same code mark as the word spelling alphabet letters 5 which is a red dot code mark 10. 8 is green dot code mark in word lane 7 and on alphabet letter T in alphabet line 2. 9 is blue dot code mark in word lane 7 and over the w in alphabet line 2. 11 is X shape mark in word lane 7 and over the letter D in 1 alphabet letter line. 18 the sentence colorcode spelling computor teaches by code means William R. Farmer inventor date August sixth 1974 is copied from certain word spelling letters code marked in the 27 lines of alphabet letters 14 is alphabet line numbers from 1 to 27 with date code number marks $^1$1 $^2$9 $^3$7$^4$4. Numbers 14 can be copied in word spelling lane 7 as a means of learning to count 12 girl code marks spells Suzie Farmer has a bicycle. 13 ✗ aeroplane. Referring now particularly to FIG. 2 of the drawings 16 is end edge view of the colorcode speller invention. 17 is accessory drawer containing colored crayons, a ruboff sponge a sample sheet of code marked letters and copied sentence, and a one alphabet row-at-a-time slide sheet.

What is claimed is:
1. A color coded speller comprising:
a surface;
a plurality of horizontally disposed lines of alphabet letters on said surface;
an equal plurality of horizontally disposed code marking lanes on said surface, each code marking lane disposed directly above a line of alphabet letters;
said horizontal code marking lanes adapted to removably receive code marks;
a plurality of vertically disposed word and sentence lanes on said surface adapted to removably receive alphabet letters whereby a teacher may place a code mark above a selected letter in some or all of said lines and a pupil may copy said selected letters in one of said vertically disposed lanes to spell words and sentences which were preselected by the teacher.
2. A color code speller as claimed in claim 1 wherein there are 27 lines of alphabet letters 27 code marking lanes and four vertical word and sentence lanes.
3. A color code speller as claimed in claim 1 wherein one of said code marks is in the form of a girl.
4. A color code speller as claimed in claim 1 wherein the code marking lanes have a surface suitable for removably receiving crayon colored code marks.
5. A color code speller as claimed in claim 1 wherein the lines of alphabet letters are covered by a clear film seal to prevent inadvertant removal of the alphabet letters.
6. A color code speller as claimed in claim 1 further comprising:
a drawer slidably mounted beneath said surface.
7. A color code speller as claimed in claim 1 wherein at the top of each of the word and sentence lanes is a different code mark corresponding to one of the code marks in the code marking lanes, whereby a different word or sentence may be spelled in each of said word and sentence lanes.

* * * * *